US012609335B2

(12) United States Patent
Bosch et al.

(10) Patent No.: US 12,609,335 B2
(45) Date of Patent: Apr. 21, 2026

(54) FUEL CELL SYSTEM WITH A DEFLECTION MEANS IN THE ANODE PATH

(71) Applicant: Robert Bosch GmbH, Stuttgart (DE)

(72) Inventors: Timo Bosch, Renningen (DE); Tobias Falkenau, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 18/004,369

(22) PCT Filed: Jun. 23, 2021

(86) PCT No.: PCT/EP2021/067107
§ 371 (c)(1),
(2) Date: Jan. 5, 2023

(87) PCT Pub. No.: WO2022/012885
PCT Pub. Date: Jan. 20, 2022

(65) Prior Publication Data
US 2023/0290972 A1 Sep. 14, 2023

(30) Foreign Application Priority Data
Jul. 15, 2020 (DE) ..................... 10 2020 208 841.1

(51) Int. Cl.
*H01M 8/04119* (2016.01)
*H01M 8/04082* (2016.01)
*H01M 8/04089* (2016.01)

(52) U.S. Cl.
CPC ... *H01M 8/04156* (2013.01); *H01M 8/04201* (2013.01)

(58) Field of Classification Search
CPC ......... H01M 8/04156; H01M 8/04201; H01M 8/04097; Y02E 60/50
(Continued)

(56) References Cited

U.S. PATENT DOCUMENTS 6,579,637 B1 * 6/2003 Savage ............. H01M 8/04156
429/414
8,236,456 B2 8/2012 Koenekamp et al.
(Continued)

FOREIGN PATENT DOCUMENTS

| CN | 103109407 A | 5/2013 |
| DE | 112013002776 T5 | 2/2015 |
| DE | 102017221302 A1 | 5/2019 |

OTHER PUBLICATIONS

Translation of International Search Report for Application No. PCT/EP2021/067107 dated Oct. 7, 2021 (3 pages).

*Primary Examiner* — Christian Roldan
(74) *Attorney, Agent, or Firm* — Michael Best & Friedrich LLP

(57) ABSTRACT

The invention relates to a fuel cell system (100), having: at least one fuel cell (101) and an anode path (10) for providing a fuel-containing reactant to the at least one fuel cell (101), wherein the anode path (10) has an inlet line (11) for providing the fuel-containing reactant to the at least one fuel cell (101) and an outlet line (12) for discharging the fuel-containing reactant from the at least one fuel cell (101), and wherein a recirculation apparatus (14) is provided between the inlet line (11) and the outlet line (12) in order to return unused fuel to the fuel cell (101). According to the invention, a deflection means (20) is provided in the inlet line (11) at a fuel cell inlet (E) in order to separate off water.

10 Claims, 1 Drawing Sheet

(58) Field of Classification Search
USPC ........................................................ 429/400
See application file for complete search history.

(56) References Cited

U.S. PATENT DOCUMENTS

| 2003/0211374 | A1  | 11/2003 | Dehne |  |
|---|---|---|---|---|
| 2010/0227230 | A1* | 9/2010  | Goebel ............ | H01M 8/04097 |
|  |  |  |  | 429/429 |
| 2011/0091779 | A1  | 4/2011  | Owejan et al. |  |
| 2011/0195344 | A1* | 8/2011  | Goebel ............ | H01M 8/04149 |
|  |  |  |  | 429/512 |
| 2014/0377675 | A1* | 12/2014 | Peterson .......... | H01M 8/04097 |
|  |  |  |  | 429/414 |
| 2015/0125775 | A1* | 5/2015  | Kuwayama ....... | H01M 8/04164 |
|  |  |  |  | 429/452 |

* cited by examiner

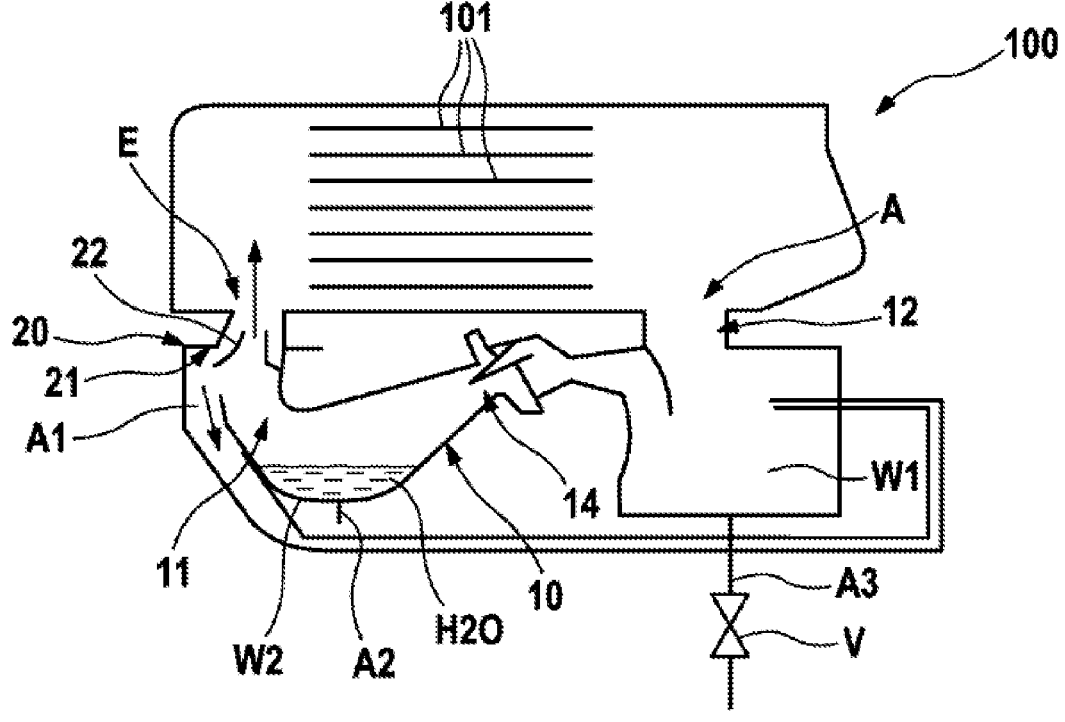

FUEL CELL SYSTEM WITH A DEFLECTION MEANS IN THE ANODE PATH

BACKGROUND

The invention relates to a fuel cell system.

Fuel cell systems use oxygen, mostly from simple ambient air, to convert hydrogen into electrical energy, waste heat, and water. The fuel cell systems typically include several fuel cells that form a stack. In order to supply reactants to the fuel cell systems, supply channels are provided, which supply hydrogen and air to the individual fuel cells and remove the depleted moist exhaust air and the depleted anode exhaust gas. In the hydrogen supply lines, recirculation pumps, e.g., in the form of jet pumps or hybrid solutions consisting of jet pumps and hydrogen blowers, are typically used to send unused hydrogen from the anode exhaust gas back to the fuel cells. As a result of these processes, water also reaches the anode side of the fuel cells. Water is an obstacle to the electrochemical reaction taking place in the fuel cell. In the gaseous state, it reduces the cell voltage and, when present in high concentration, can damage the cells since they are no longer sufficiently supplied with hydrogen. In the liquid state, it can block active layers on the membranes, thereby locally cutting off portions of the fuel cells from the hydrogen supply. This results in harmful side reactions. Accumulating product water is therefore separated from the anode exhaust gas at the outlet from the fuel cells using water separators. Usually, this occurs directly at the anode outlet of the fuel cell stack. However, the water separators are not able to remove all water from the anode gas.

SUMMARY

According to one aspect, the invention provides a fuel cell system with the features of the independent apparatus claim. Further advantages, features, and details of the invention arise from the subclaims, the description, and the drawings. Of course, features and details described in connection with the different aspects according to the invention also apply in connection with the other aspect according to the invention, and respectively vice versa, so that with respect to the disclosure, mutual reference to the individual aspects of the invention is or can always be made.

The present invention provides a fuel cell system, having: at least one fuel cell and an anode path for providing a fuel-containing reactant to the at least one fuel cell, wherein the anode path has an inlet line for providing the fuel-containing reactant to the at least one fuel cell and an outlet line for discharging the fuel-containing reactant from the at least one fuel cell, and wherein a recirculation apparatus is provided between the inlet line and the outlet line in order to return unused fuel to the fuel cell. According to the invention, a deflection means (or in other words a deflection portion, which is formed continuously and/or materially uniformly with the inlet line) is provided at the fuel cell inlet in order to separate off water, in particular product water seeped into the outlet line or water reaching the outlet line in any other way, e.g., by condensation, the separation preferably taking place due to a weight force of the water and/or due to a pressure gradient as a result of the flow of the fuel-containing reactant.

The fuel cell system according to the invention may be designed in the form of a fuel cell stack having several stacked repeat units in the form of individual fuel cells, preferably PEM fuel cells.

The fuel cell system according to the invention may advantageously be used for mobile applications, e.g., in motor vehicles, or for stationary applications, e.g., in generator systems.

The deflection means is a monolithic part or portion of the inlet line, said means being formed at the inlet to the at least one fuel cell in a specific manner according to the present invention, namely such that the water comprising the product water seeped into the outlet line is separated off. The deflection means or this portion of the inlet line is designed such that the weight force of the water and/or a pressure gradient as a result of the flow of the fuel-containing reactant conveys the water away from the fuel cell inlet, where it is collected and/or transported to the outside and/or into an exhaust-air line of a cathode path, if necessary in a manner controlled by a drain valve. In addition, a primary water separator may be provided in the outlet line. In principle, however, it is conceivable that the deflection means can safely remove the water even without the water separator in the outlet line or only with support from the water separator in the outlet line.

The idea of the invention is that anode-side liquid water is separated from the inlet line, in particular downstream of a primary water separator and a fresh gas metering. According to the invention, the deflection means is provided downstream of the recirculation apparatus, e.g., in the form of a jet pump. The deflection means may advantageously be designed in the form of a tube-bend separator. At least a first drain bore may be provided on the deflection means. The deflection means may preferably comprise protruding edges, e.g., circumferentially, at least partially or completely. Optionally, at its lowest point, the deflection means may comprise a second water separator and, if necessary, a second drain bore. The liquid water is forced by the deflection means to drain through a driving pressure gradient across the recirculation apparatus, e.g., directly into the first water separator with driving pressure gradient or into the drain of the first water separator. Furthermore, a collecting channel can be provided within the deflection means and preferably coaxially with the deflection means so that the inlet line in this area forms a double-walled tube, e.g., in the form of an inverted funnel or an inverted truncated cone. The collecting channel can collect any liquid water trickling downward from the fuel cell inlet at the circumference of the inlet line and guide it selectively, for example, into the first drain bore of the deflection means. The driving force is the weight force of the water.

The at least one fuel cell within the meaning of the invention is preferably arranged above the anode path with the inlet line and the outlet line in order to utilize the weight force of the water by the deflection means according to the invention.

Drainage of the water through the deflection means according to the invention may preferably be enabled in the flow direction opposite to the flow direction of the fuel-containing reactant.

Furthermore, in a fuel cell system, the invention may provide that the deflection means is designed in the form of a tube-bend separator. The deflection means may thus be realized in a simple and cost-efficient manner.

Furthermore, in a fuel cell system, the invention may provide that the deflection means is designed in the form of an inverted funnel and/or an inverted truncated cone (as seen in the vertical direction or stacking direction of the fuel cell system), which preferably points with the narrowest point toward the fuel cell inlet and faces with the widest point away from the fuel cell inlet. Drainage of the water may thus be facilitated.

Furthermore, in a fuel cell system, the invention may provide that the deflection means comprises a collar element, which preferably projects circumferentially from the inlet line, and which is in particular located lower than the fuel cell inlet. The flow of the lighter fuel-containing reactant may thus flow through the narrower opening at the fuel cell inlet, while the heavier water bounces off the collar element and is separated off.

In addition, in a fuel cell system, the invention may provide that the deflection means, in particular on the collar element, (at least) comprises a first drain bore, which preferably faces away from (or leads away from) the fuel cell inlet, and which is in particular arcuate or descends substantially perpendicularly (as seen in the vertical direction or stack direction of the fuel cell system). The trapped water may thus drain from the inlet line.

Furthermore, in a fuel cell system, the invention may provide that on the deflection means, a collecting channel (formed circumferentially at least in part within the inlet line in the area of the deflection means) for trickling water is provided in the direction away from the fuel cell inlet and in particular toward a first drain bore. The collecting channel may advantageously facilitate the collection of the water.

Furthermore, in a fuel cell system, the invention may provide that the collecting channel has a smaller diameter at the narrowest point than the fuel cell inlet and a fuel cell outlet. In a manner of speaking, a nozzle may thus be provided at the fuel cell inlet.

Furthermore, in a fuel cell system, the invention may provide that the collecting channel is designed in the form of an inverted funnel and/or an inverted truncated cone, which preferably points with the narrowest point toward a fuel cell inlet and faces with the widest point away from the fuel cell inlet. A double-walled tube can thus be formed by the collecting channel and the deflection means, which tube allows the water to flow off (substantially downward) in a vortex-like manner between the walls and enables a flow of the fuel-containing reactant through the inner tube in the reverse direction (substantially upward) with a nozzle effect.

In addition, in a fuel cell system, the invention may provide that the collecting channel is arranged (at least in part circumferentially) coaxially with the inlet line in the area of the deflection means, and/or the collecting channel and the inlet line form a double-walled tube section in the area of the deflection means. The collecting channel can thus advantageously improve the functionality of the deflection means.

In addition, in a fuel cell system, the invention may provide that a first or primary water separator is provided in the outlet line. The primary water separator may advantageously be provided in addition to the deflection means within the meaning of the invention.

Furthermore, in a fuel cell system, the invention may provide that a second or secondary water separator is provided between the deflection means and the recirculation apparatus. The second water separator may be designed as part of the deflection means, e.g., in the form of a depression at the lowest point of the deflection means. In the second water separator, the water may be collected before it drains, in particular in a regulated and/or controlled manner, e.g., by a drain valve.

According to a further advantage, a water-absorbing material may be provided in the primary and/or secondary water separators.

Furthermore, in a fuel cell system, the invention may provide that the deflection means, in particular at the second water separator, comprises a second drain bore, which preferably faces away from the fuel cell inlet, and which in particular descends substantially perpendicularly (as seen in particular in the vertical direction).

In the context of the invention, it is furthermore possible that a first drain bore and/or a second drain bore of the deflection means is connected directly to the first water separator in the outlet line or to a drain from the first water separator in the outlet line. In this way, the pressure gradients within and/or above the first water separator can be utilized.

BRIEF DESCRIPTION OF THE DRAWINGS

The invention and its developments, as well as its advantages, are explained in further detail below with reference to the FIGURE. Here:

FIG. 1 shows a schematic illustration of a fuel cell system within the meaning of the invention.

DETAILED DESCRIPTION

FIG. 1 shows a fuel cell system 100 within the meaning of the invention. The fuel cell system 100 comprises at least one fuel cell 101, or with several stacked repeat units in the form of individual fuel cells 101, and an anode path 10 for providing a fuel-containing reactant to the at least one fuel cell 101, wherein the anode path 10 comprises an inlet line 11 for providing the fuel-containing reactant to the at least one fuel cell 101 and an outlet line 12 for discharging the fuel-containing reactant from the at least one fuel cell 101, and wherein a recirculation apparatus 14 is provided between the inlet line 11 and the outlet line 12 in order to return, in particular convey, unused fuel back to the fuel cell 101.

According to the invention, a deflection means 20 (or in other words a deflection portion, which is formed continuously and/or materially uniformly with the inlet line 11) is provided at a fuel cell inlet E in the inlet line 11 in order to separate off water $H2O$, in particular product water seeped into the outlet line or water $H2O$ reaching the outlet line in any other way, e.g., by condensation, the separation preferably taking place due to a weight force of the water $H2O$ and/or due to a pressure gradient as a result of the flow of the fuel-containing reactant.

The shown fuel cell system 101 can advantageously be used in mobile applications, e.g., in motor vehicles, or in stationary applications, e.g., in generator systems.

As FIG. 1 indicates, the deflection means 20 is designed as a monolithic part or portion of the inlet line 11. This part or portion is formed at the fuel cell inlet E into the at least one fuel cell 101 such that water $H2O$ is safely separated off. This part or portion is designed such that water is safely removed from the fuel cell inlet E by the weight force of the water $H2O$ and/or by a pressure gradient as a result of the flow of the fuel-containing reactant. The removal of the water $H2O$ can take place (via a primary water separator W1 and further if necessary) to the outside into the environment and/or into an exhaust-air line of a cathode path, where it is mixed with the exhaust air in order to avoid unwanted accumulations of fuel. The removal of the water $H2O$ may preferably take place in a controlled manner, e.g., by means of a drain valve V.

Although FIG. 1 shows a primary water separator W1 in the outlet line 12, it is generally conceivable that the deflection means 20 can safely remove the water even without the primary water separator W1 in the outlet line 12 or only with the support therefrom.

As FIG. 1 furthermore shows, the deflection means 20 according to the invention is arranged downstream of a primary water separator W1, the recirculation apparatus 14, e.g., in the form of a jet pump, and a fresh gas metering 15 in the inlet line 11.

As FIG. 1 also shows, the deflection means 20 is designed in the form of a tube-bend separator.

At least a first drain bore A1 may be provided on the deflection means 20.

The deflection means may preferably comprise protruding edges or a protruding collar element 21, which is formed, for example, circumferentially, at least partially or completely, on the inlet line 11 in the area of the deflection means 20.

Optionally, at its lowest point, the deflection means 20 may comprise a second water separator W2, e.g., in the form of a channel or a disk or a depression, with a second drain bore A2 if necessary.

The water H2O is forced by the deflection means 20 to flow in the direction opposite to the flow direction of the fuel-containing reactant, e.g., directly into the first water separator W1 or into the drain from the first water separator W1.

Furthermore, FIG. 1 shows that a (completely or partially circumferential) collecting channel 22 may be provided within the deflection means 20, preferably coaxially with the deflection means 20, so that the inlet line 11 in this area forms a double-walled tube.

Both the deflection means 20 and the collecting channel 22 can be formed in this area in the form of an inverted funnel or an inverted truncated cone in order to form a double-walled tube.

The collecting channel 22 can collect any water H2O trickling downward from the fuel cell inlet E at the circumference of the inlet line 11 and guide it selectively, for example, into the first drain bore A1 of the deflection means 20.

The at least one fuel cell 101 is preferably arranged above the anode path 10 with the inlet line 11 and the outlet line 12 in order to utilize the weight force of the water H2O by the deflection means 20 according to the invention.

As indicated in FIG. 1 with the arrows, the drainage of the water H2O through the deflection means 20 according to the invention may preferably take place in the flow direction opposite to the flow direction of the fuel-containing reactant.

Again, the collecting channel 22 may have a smaller diameter at the narrowest point than the fuel cell inlet E and the fuel cell outlet A in order to induce better drainage of the water H2O at the collecting channel 22.

The collecting channel 22 may preferably be designed in the form of an inverted funnel and/or an inverted truncated cone, which preferably points with the narrowest point toward a fuel cell inlet E and faces with the widest point away from the fuel cell inlet E. As shown in FIG. 1, a double-walled tube is thus formed by the collecting channel 22 and the deflection means 20, which tube allows the water H2O to flow off (substantially downward) between the walls and enables a flow of the fuel-containing reactant through the inner tube in the reverse direction (substantially upward) with a nozzle effect.

It is furthermore conceivable that a water-absorbing material may be provided in the primary and/or secondary water separators W1, W2.

Furthermore, at the bottom of the second water separator W2, the deflection means 20 may have a second drain bore A2.

As indicated in FIG. 1, the first drain bore A1 and/or the second drain bore A2 of the deflection means 20 may be connected directly to the first water separator W1 in the outlet line 12 or to a drain A3 from the first water separator W1 in the outlet line 12.

The above description of the FIGURES describes the present invention solely in the context of examples. Of course, individual features of the embodiments can be freely combined with one another, insofar as technically sensible, without leaving the scope of the invention.

The invention claimed is:

1. A fuel cell system (100) comprising:
at least one fuel cell (101)
and an anode path (10) configured for providing a fuel-containing reactant to the at least one fuel cell (101),
wherein the anode path (10) has
an inlet line (11) configured for providing the fuel-containing reactant to the at least one fuel cell (101)
and an outlet line (12) configured for discharging the fuel-containing reactant from the at least one fuel cell (101),
and wherein a recirculation apparatus (14) is provided between the inlet line (11) and the outlet line (12) in order to return unused fuel to the fuel cell (101),
wherein a deflection means (20) is provided in the inlet line (11) at a fuel cell inlet (E) in order to separate off water;
wherein a collecting channel (22) configured for water trickling in a direction away from the fuel cell inlet (E) and toward a first drain bore (A1) is provided on the deflection means (20), wherein the collecting channel (22) has a smaller diameter at a narrowest point than the fuel cell inlet (E) and a fuel cell outlet (A); and
wherein the collecting channel (22) is arranged coaxially with the inlet line (11) in an area of the deflection means (20);
wherein the deflection means 20 is an inverted funnel and/or an inverted truncated cone, which points with a narrowest point toward a fuel cell inlet (E) and faces with a widest point away from the fuel cell inlet (E), and
wherein the collecting channel (22) and the inlet line (11) form a double-walled tube section in the area of the deflection means (20).

2. The fuel cell system (100) according to claim 1, wherein the deflection means (20) is a tube-bend separator, and/or wherein the deflection means (20) is an inverted funnel and/or an inverted truncated cone, which points with a narrowest point toward the fuel cell inlet (E) and faces with a widest point away from the fuel cell inlet (E).

3. The fuel cell system (100) according to claim 1, wherein the deflection means (20) comprises a collar element (21) that projects circumferentially from the inlet line (11) and that is located lower than the fuel cell inlet (E).

4. The fuel cell system (100) according to claim 1, wherein the deflection means (20) comprises a first drain bore (A1), which faces away from the fuel cell inlet (E) and which is arcuate or descends substantially perpendicularly.

5. The fuel cell system (100) according to claim 1, wherein a first water separator (W1) is provided in the outlet line (12).

6. The fuel cell system (100) according to claim 5, wherein a second water separator (W2) is provided between the deflection means (20) and the recirculation apparatus (14).

7. The fuel cell system (100) according to claim 6, wherein the deflection means (20) at the second water separator (W2), comprises a second drain bore (A2), which faces away from the fuel cell inlet (E) and which descends substantially perpendicularly.

8. The fuel cell system (100) according to claim 7, wherein the first drain bore (A1) and/or the second drain bore (A2) of the deflection means (20) are/is directly connected to the first water separator (W1) in the outlet line (12) or to a drain (A3) from the first water separator (W1) in the outlet line (12).

9. The fuel cell system (100) according to claim 2, wherein the deflection means (20) comprises a collar element (21) that projects circumferentially from the inlet line (11) and that is located lower than the fuel cell inlet (E).

10. The fuel cell system (100) according to claim 1, wherein a water separator (W2) is provided between the deflection means (20) and the recirculation apparatus (14).

* * * * *